(12) United States Patent
Gast

(10) Patent No.: US 8,978,105 B2
(45) Date of Patent: Mar. 10, 2015

(54) AFFIRMING NETWORK RELATIONSHIPS AND RESOURCE ACCESS VIA RELATED NETWORKS

(75) Inventor: Matthew S. Gast, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 1418 days.

(21) Appl. No.: 12/336,492

(22) Filed: Dec. 16, 2008

(65) Prior Publication Data

US 2010/0024007 A1    Jan. 28, 2010

Related U.S. Application Data

(60) Provisional application No. 61/083,876, filed on Jul. 25, 2008.

(51) Int. Cl.
| | |
|---|---|
| *G06F 15/16* | (2006.01) |
| *H04L 29/06* | (2006.01) |
| *G06F 21/62* | (2013.01) |
| *H04W 12/08* | (2009.01) |
| *H04W 48/14* | (2009.01) |
| *H04W 88/14* | (2009.01) |

(52) U.S. Cl.
CPC .......... *H04L 63/102* (2013.01); *G06F 21/6218* (2013.01); *H04W 12/08* (2013.01); *H04W 48/14* (2013.01); *H04W 88/14* (2013.01)
USPC .................................................. 726/4; 726/3

(58) Field of Classification Search
CPC . G06F 21/6218; H04L 63/102; H04W 88/14; H04W 48/14; H04W 12/08
USPC ....................................................... 726/4, 2, 3
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | de Couasnon et al. |
| 4,176,316 A | 11/1979 | DeRosa et al. |
| 4,247,908 A | 1/1981 | Lockhart, Jr. et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |

(Continued)

FOREIGN PATENT DOCUMENTS

| | | |
|---|---|---|
| EP | 0 992 921 A2 | 4/2000 |
| EP | 1 542 409 A | 6/2005 |

(Continued)

OTHER PUBLICATIONS

Acampa and Winters, IEEE Journal on selected Areas in Communications. SAC-5:796-804 (1987).

(Continued)

*Primary Examiner* — Baotran N To

(57) ABSTRACT

A technique for providing a prediction as to whether a resource will be accessible to a user is described. The technique can involve comparing asserted membership in a wireless realm with membership records. Advantageously, a user can be made aware of the likelihood of access to a resource before attempting to reach the resource.

20 Claims, 8 Drawing Sheets

(56) References Cited

U.S. PATENT DOCUMENTS

| | | |
|---|---|---|
| 4,550,414 A | 10/1985 | Guinon et al. |
| 4,562,415 A | 12/1985 | McBiles |
| 4,630,264 A | 12/1986 | Wah et al. |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad et al. |
| 4,673,805 A | 6/1987 | Shepard et al. |
| 4,707,839 A | 11/1987 | Andren et al. |
| 4,730,340 A | 3/1988 | Frazier, Jr. |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener, Sr. et al. |
| 4,850,009 A | 7/1989 | Zook et al. |
| 4,872,182 A | 10/1989 | McRae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten et al. |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund et al. |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney, II et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown et al. |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright et al. |
| 6,088,591 A | 7/2000 | Trompower et al. |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright et al. |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe et al. |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |

(56) References Cited

U.S. PATENT DOCUMENTS

| | | |
|---|---|---|
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 * | 2/2005 | Henry et al. .......... 455/411 |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B2 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow et al. |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,603,119 B1 | 10/2009 | Durig et al. |
| 7,636,363 B2 | 12/2009 | Chang et al. |
| 7,680,501 B2 | 3/2010 | Sillasto et al. |
| 7,693,526 B2 | 4/2010 | Qian et al. |
| 7,715,432 B2 | 5/2010 | Bennett |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |

(56) References Cited

U.S. PATENT DOCUMENTS

| | | |
|---|---|---|
| 7,929,922 B2 | 4/2011 | Kubo |
| 7,945,399 B2 | 5/2011 | Nosovitsky et al. |
| 7,986,940 B2 | 7/2011 | Lee et al. |
| 8,019,082 B1 | 9/2011 | Wiedmann et al. |
| 2001/0024953 A1 | 9/2001 | Balogh |
| 2002/0021701 A1 | 2/2002 | Lavian et al. |
| 2002/0052205 A1 | 5/2002 | Belostotsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1* | 6/2004 | Seshadri et al. ........... 370/310.2 |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0248557 A1* | 12/2004 | Muratsu ........................ 455/411 |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetto et al. |
| 2005/0259611 A1 | 11/2005 | Bhagwat et al. |
| 2005/0270992 A1 | 12/2005 | Sanzgiri et al. |
| 2005/0273442 A1 | 12/2005 | Bennett et al. |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |

(56) References Cited

U.S. PATENT DOCUMENTS

| | | |
|---|---|---|
| 2006/0174336 A1 | 8/2006 | Chen |
| 2006/0178168 A1 | 8/2006 | Roach |
| 2006/0182118 A1 | 8/2006 | Lam et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vleugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0268696 A1 | 11/2006 | Konstantinov et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0010248 A1 | 1/2007 | Dravida et al. |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1 | 4/2007 | Donald Hart et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0150945 A1 | 6/2007 | Whitaker et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0189222 A1 | 8/2007 | Kolar et al. |
| 2007/0195793 A1 | 8/2007 | Grosser et al. |
| 2007/0230457 A1 | 10/2007 | Kodera et al. |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0096575 A1 | 4/2008 | Aragon et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1 | 6/2008 | Fridman et al. |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0010206 A1* | 1/2009 | Giaretta et al. ............... 370/328 |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0067436 A1 | 3/2009 | Gast |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Peden, II et al. |
| 2010/0002610 A1 | 1/2010 | Bowser et al. |
| 2010/0040059 A1 | 2/2010 | Hu |
| 2010/0067379 A1 | 3/2010 | Zhao et al. |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0261475 A1 | 10/2010 | Kim et al. |
| 2010/0329177 A1 | 12/2010 | Murphy et al. |
| 2011/0128858 A1 | 6/2011 | Matta et al. |
| 2011/0158122 A1 | 6/2011 | Murphy et al. |
| 2011/0255466 A1 | 10/2011 | Gast et al. |

FOREIGN PATENT DOCUMENTS

| | | |
|---|---|---|
| GB | 2 329 801 A | 3/1999 |
| GB | 2429080 | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO-9403986 | 2/1994 |
| WO | WO-9911003 | 3/1999 |
| WO | WO 00/06271 A1 | 2/2000 |
| WO | WO 00/18148 | 3/2000 |
| WO | WO 02/089442 A1 | 11/2002 |
| WO | WO-03085544 | 10/2003 |
| WO | WO 2004/013986 A1 | 2/2004 |
| WO | WO-2004095192 | 11/2004 |
| WO | WO-2004095800 | 11/2004 |

OTHER PUBLICATIONS

Acampora and Winters, IEEE Communications Magazine, 25(8):11-20 (1987).

Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.

Fortune et al., IEEE Computational Science and Engineering, "Wise Design of Indoor Wireless Systems: Practical Computation and Optimization", p. 58-68 (1995).

Freret et al., Applications of Spread-Spectrum Radio to Wireless Terminal Communications, Conf. Record. Nat'l Telecom. Conf., Nov. 30-Dec. 4, 1980.

(56) References Cited

OTHER PUBLICATIONS

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propogation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 801.11b (1999).
Okamoto and Xu, IEEE, Proceedings of the 13th Annual Hawaii International Conference on System Sciences, pp. 54-63 (1997).
Panjawani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Acheivable Accuracy of Site-Specific Path-Loss Predictions in Residential Environments", IEEE Transactions on Vehicular Technology, vol. 48, No. 3, May 1999.
Puttini, R., Percher, J., Me, L., and De Sousa, R. 2004. A fully distributed IDS for MANET. In *Proceedings of the Ninth international Symposium on Computers and Communications 2004* vol. 2 (*ISCC"04*)—vol. 2 (Jun. 28-Jul. 1, 2004). ISCC. IEEE Computer Society. Washinaton. DC. 331-338.
Seidel et al, "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus", IEEE ICUPC '96 Proceedings (1996).
Ullmo et al., "Wireless Propogation in Buildings: A Statistic Scattering Approach", IEEE Transactions on Vehicular Technology, vol. 48, No. 3, May 1999.
Co-pending U.S. Appl. No. 10/778,901, filed Feb. 13, 2004.
Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,073, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/131,028, filed May 3, 2008.
Co-pending U.S. Appl. No. 12/489,295, filed Jun. 22, 2009.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5, 2006.
Non-Final Office Action Mailed Aug. 6, 2009 in Co-pending U.S. Appl. No. 11/330,877, filed Jan. 11, 2006.
Final Office Action Mailed Mar. 13, 2009 in Co-pending U.S. Appl. No. 11/330,877, filed Jan. 11, 2006.
Non-Final Office Action Mailed Sep. 11, 2008 in Co-pending U.S. Appl. No. 11/330,877, filed Jan. 11, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed, Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Notice of Allowance Mailed Mar. 19, 2010, in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.

(56) References Cited

OTHER PUBLICATIONS

Written Opinion PCT/US07/089134 dated Apr. 10, 2008, pp. 1-4.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
P. Bahl et al., Radar: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters, vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 12/763,057, filed Apr. 19, 2010.
U.S. Appl. No. 09/866,474, filed May 29, 2001.
U.S. Appl. No. 13/017,801, filed Jan. 31, 2011.
Final Office Action for U.S. Appl. No. 11/784,307, mailed Jun. 14, 2010.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 12/500,392, mailed Jun. 20, 2011.
Office Action for U.S. Appl. No. 12/489,295, mailed Apr. 27, 2011.
Final Office Action for U.S. Appl. No. 12/489,295, mailed Jan. 18, 2012.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 12/785,362, mailed Apr. 22, 2011.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 12/370,562, mailed Jan. 17, 2012.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 12/683,281, mailed Jan. 20, 2012.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Final Office Action for U.S. Appl. No. 12/304,100, mailed Feb. 2, 2012.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Final Office Action for U.S. Appl. No. 12/077,051, mailed Oct. 25, 2011.
Office Action for U.S. Appl. No. 12/113,535, mailed Apr. 21, 2011.
Final Office Action for U.S. Appl. No. 12/113,535, mailed Jan. 3, 2012.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.

(56) References Cited

OTHER PUBLICATIONS

Final Office Action for U.S. Appl. No. 11/852,234, mailed Jan. 20, 2012.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/210,917, mailed Dec. 5, 2011.
Office Action for U.S. Appl. No. 12/350,927, mailed Aug. 17, 2011.
Final Office Action for U.S. Appl. No. 12/350,927, mailed Jan. 18, 2012.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.

\* cited by examiner

AFFIRMING NETWORK RELATIONSHIPS AND RESOURCE ACCESS VIA RELATED NETWORKS

CROSS-REFERENCE TO RELATED APPLICATIONS

This application claims priority to U.S. Provisional Application 61/083,876, filed Jul. 25, 2008, entitled ROAMING CONSORTIUM, which is hereby incorporated by reference in its entirety.

BACKGROUND

In 802.11 network communications, a user of a wireless station may desire to access a network resource. Often a plurality of different access points will be available to a user. At times, some of these networks may provide access to the network resource, whereas others may not. For example, consider wireless network access points in an airport where networks compete for users by offering competitive network pricing.

Networks may or may not offer service to a network resource without cost. Often, network access is provided with a cost. However, there are times when a network provider may offer selective network access without cost such as where economic benefits will inure to the network provider for doing so.

For example, consider a partnership or agreement between network owners or operators that defines permission for users to use networks. The network owners can enlarge their networks by sharing access to their networks. At times the access can be provided without additional cost to the user over the user's payment to access one of many such networks.

For example, multiple networks in different countries or regions could agree to allow common use of each network in each country or region. The use could be without additional cost to that paid for the use in a user's home country or region.

Alternatively, a first commercial establishment may allow access to specific network resources offered by other commercial establishments. The commercial establishments can benefit by sharing patrons.

For example, a hotel might offer free network access to airport/airline websites from within the hotel and the airport/airlines might similarly offer reciprocal access from within an airport. This would allow for mutually beneficial use of the networks leading to repeat business and other economic benefits to the hotel and airport/airline.

When many commercial establishments or networks present a user with access points the user may not know that the networks will allow access without cost. Often the user can have permission to use a partner network to reach a network resource, but will have to try different networks before finding one that she has permission to use. The user can be left wondering which networks are available to her. Such a user could waste time trying to determine which networks will allow access to the network resource.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for providing a prediction as to whether a resource will be accessible to a user is described. The technique can involve comparing asserted membership in a wireless realm with membership records. Advantageously, a user can be made aware of the likelihood of access to a resource before attempting to reach the resource.

Typically, one or more access points (APs) in range of a station associated with the user can be identified as providing direct or indirect access to a network resource. The APs providing such access, with or without cost depending upon the implementation and/or configuration, can be presented to the user for selection. If the user can attach to the AP and has appropriate membership rights, then the user can access the network resource.

A potential authentication indication (PAI) engine can determine whether it is possible for a station to authenticate to a network. A user of the station can assert membership in a wireless realm, and send the asserted membership to the PAI engine. The PAI engine can compare the asserted membership to membership records, and indicate whether a user having the asserted membership can potentially authenticate with a target network.

Advantageously, the PAI can inform a user of the possibility that the user can authenticate to a target network before trying to authenticate. The PAI can provide a list of networks and the user can select one from the list. By identifying possible networks, the user can save time by avoiding networks that will not allow authentication. Also, the station associated with the user may save power by avoiding unnecessary attempts.

A system designed in accordance with the technique can include a query front-end processing (QFP) engine, a membership comparison engine coupled to the QFP engine, a network resource name (NRN) table coupled to the membership comparison engine, and a network resource access prediction engine coupled to the membership comparison engine and the QFP engine. The QFP engine, membership comparison engine, and NRN table can work together to indicate to a user of a station whether it is possible for the station to authenticate to a target network.

In a method designed with the technique, a station can transmit a query transport protocol (QTP) query to an AP. The query can include an asserted membership of a user in a network, such as a wireless realm, home network, or other applicable network. A response to the QTP query can include an indication as to whether authentication to a target network is possible. Thus, the QTP query is useful in eliciting a response from an AP that indicates whether it is possible to authenticate to a target network. The target network need not be the network in which membership is asserted.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
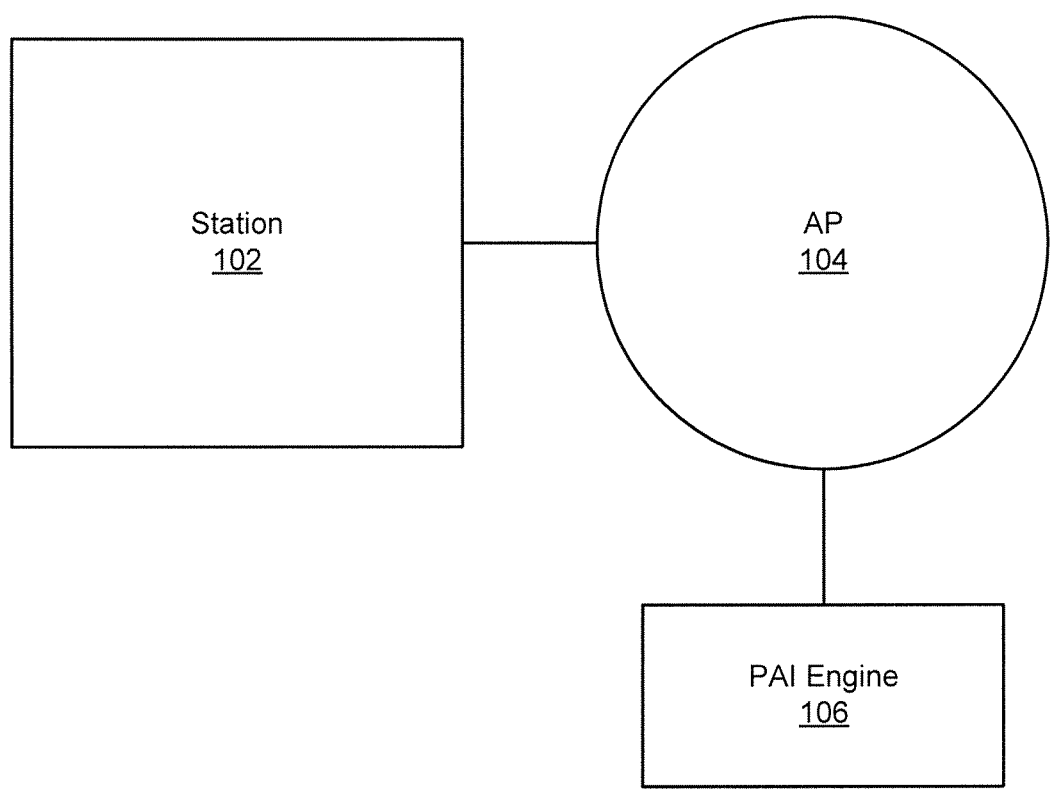
FIG. 1 depicts an example of a system for determining whether it is possible for a station with a user having an asserted membership to authenticate to a target network.

FIG. 1 depicts an example of a system 100 for determining whether it is possible for a station with a user having an asserted membership to authenticate to a target network. The system 100 includes a station 102, an access point (AP) 104, and a potential authentication indication (PAI) engine 106. The station 102 is coupled to the AP 104 and the AP 104 is coupled to the PAI engine 106.

In the example of FIG. 1, the station 102 can include a laptop, a wireless telephone, portable digital assistant (PDA), desktop computer, or any other applicable computing device capable of communication on a wireless network. A "station," as used herein, may or may not be referred to as a device with a media access control (MAC) address and a physical layer (PHY) interface to the wireless medium that comply with the Institute of Electrical and Electronic Engineers (IEEE) 802.11 standard. In general, a station can comply with any wireless standard or none at all, and may have any known or convenient interface to a wireless or other medium.

The station 102 can include a radio capable of generating signals compatible with communication on one or more networks. The station 102 can transmit and receive data as radio frequency (RF) signals. The radio can operate on any band in which a wireless standard, e.g., 802.11, is standardized. The station 102 can also include multiple radios. For example, the station 102 could include a 2.4 and a 5 GHz radio.

The station 102 can be associated with membership in a network. The network can be, for example, a wireless realm. A "wireless realm" can be a network operated by a particular entity, such as a wireless access provider. A user of the station 102 can purchase or otherwise be given a membership allowing use of the wireless realm such as by various "hot spots" or locations where the entity provides wireless access. At times the entity responsible for the network partners with other wireless access providers to provide access to shared networks. The station 102 can be used to access a resource of a network through the network or a shared network. Of course, the station 102 can also be used to access the resource through some other network, such as a free or subscription network.

In the example of FIG. 1, the AP 104 is in radio communication with the station 102. The AP 104 can retransmit received wireless signals over, for example, an Ethernet connection. The AP can be implemented as a station, but is generally referred to as an AP in this paper so as to distinguish the AP 104 from the station 102. Depending upon the context and/or implementation, the station 102 and AP 104 could be referred to as stations, or the station 102 could be referred to as a non-AP station.

In the example of FIG. 1, the PAI engine 106 can include special purpose hardware, firmware, software, system, or arrangement operable to predict access to a network resource. Modules of an example PAI engine are discussed later with reference to FIG. 2.

In the example of FIG. 1, in operation, the station 102 transmits a generic query transport protocol (QTP) query to the AP 104. The QTP query can include a domain name container defining membership in a wireless realm and can include one or more units of information defining the membership of a station to the wireless realm. The QTP query can be structured to include multiple domain name containers and/or can define membership to multiple wireless realms.

The QTP query is structured to enable the station 102 to query the AP 104. The purpose of the QTP query in this case is to answer the question, "will a user be allowed access to a network resource upon a yet un-attempted access request for the network resource?" The QTP query may or may not be used to answer other questions at the same or other times.

A generic advertising service (GAS) query is an example of a basic structure of an 802.11-compatible QTP. The GAS is a protocol that allows a station to ask questions of an AP and get answers. In the 802.11 standard GAS query, a domain name container includes data sufficient to identify an asserted membership. More generally, an asserted membership is a wireless realm, or data sufficient to identify a wireless realm, in any format.

In the example of FIG. 1, in operation, the AP 104 receives the QTP query and provides the QTP query to the PAI engine 106. The PAI engine 106 can receive the QTP query including the domain name container that includes the one or more units of information defining a membership in the wireless realm.

The PAI engine 106 compares the membership in the wireless realm(s) to membership access for the network resource. The PAI engine 106 determines whether the station 102 has access to the wireless realm(s) necessary to access the network resource.

The PAI engine 106 provides a response to the AP 104, which transmits a response defining membership access to the network resource to the station 102. The response predicts whether the station will be allowed access to the network resource upon an attempt to access the network resource.

The station 102 receives the response from the AP 104 including an indication of a relationship between the network resource and the membership in the wireless realm. The indication can predict that the station 102 will be allowed access by the AP 104 to the network resource. The response can be displayed to a user of the station 102, or can be automatically acted on by another processor in the station 102.

Figure 2:
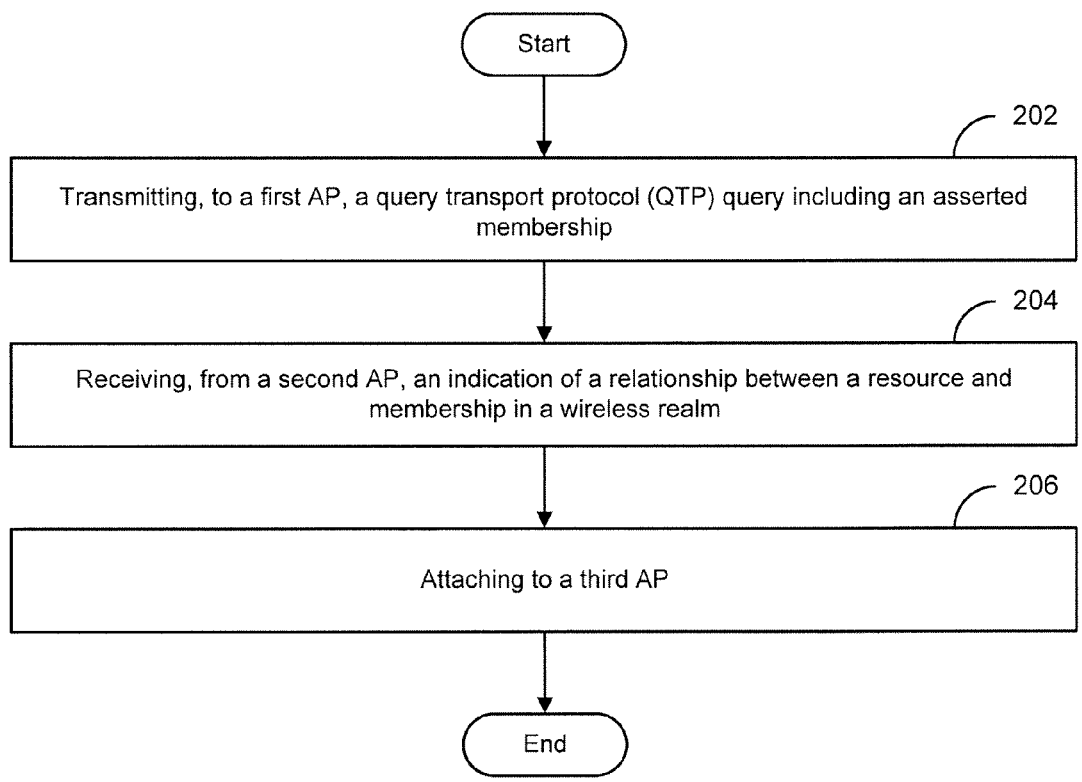
FIG. 2 depicts a flowchart of an example of a process for predicting access to a network resource for a station, and attaching if the prediction is favorable.

FIG. 2 depicts a flowchart 200 of an example of a process for predicting access to a network resource for a station, and attaching if the prediction is favorable. The process is organized as a sequence of modules in the flowchart 200. However, it should be understood that these and modules associated with other processes and methods described herein may be reordered for parallel execution or into different sequences of modules.

In the example of FIG. 2, the flowchart 200 starts at module 202 with transmitting, to a first AP, a QTP query including an asserted membership. The QTP query can include, for example, a domain name container defining membership in a wireless realm. The query can seek to determine whether a station associated with the QTP query will be allowed access to a network resource if the asserted membership is true.

In the example of FIG. 2, the flowchart 200 continues to module 204 with receiving, from a second AP, an indication of a relationship between the network resource and membership in a wireless realm. The membership in the wireless realm can be indirectly determined using the membership in the domain container, or the membership in the domain name container could itself be the membership in the wireless realm. It should be noted that, depending upon the implementation, configuration, and/or environmental factors (e.g., roaming) the first AP and the second AP can be the same AP or different APs. Depending upon the implementation, the fact that the indication of a relationship is received can indicate the relationship is likely to enable attachment to an AP, while a failure to receive the indication of a relationship can indicate that the relationship is unlikely to enable attachment to the AP. (Of course, a lack of a response can also be for other reasons, such as a message failure.)

In the example of FIG. 2, the flowchart 200 continues to module 206 with attaching to a third AP. It should be noted that, depending upon the implementation, configuration, and/or environmental factors, the first AP and the third AP can be the same or different APs. Also, the second AP and the third AP can be the same or different APs. As used in this paper, "attaching" refers to actions taken at a station to associate, authenticate, and/or otherwise wirelessly connect to an AP. A station having attached to the third AP after receiving a favorable prediction, the flowchart 200 ends.

Figure 3:
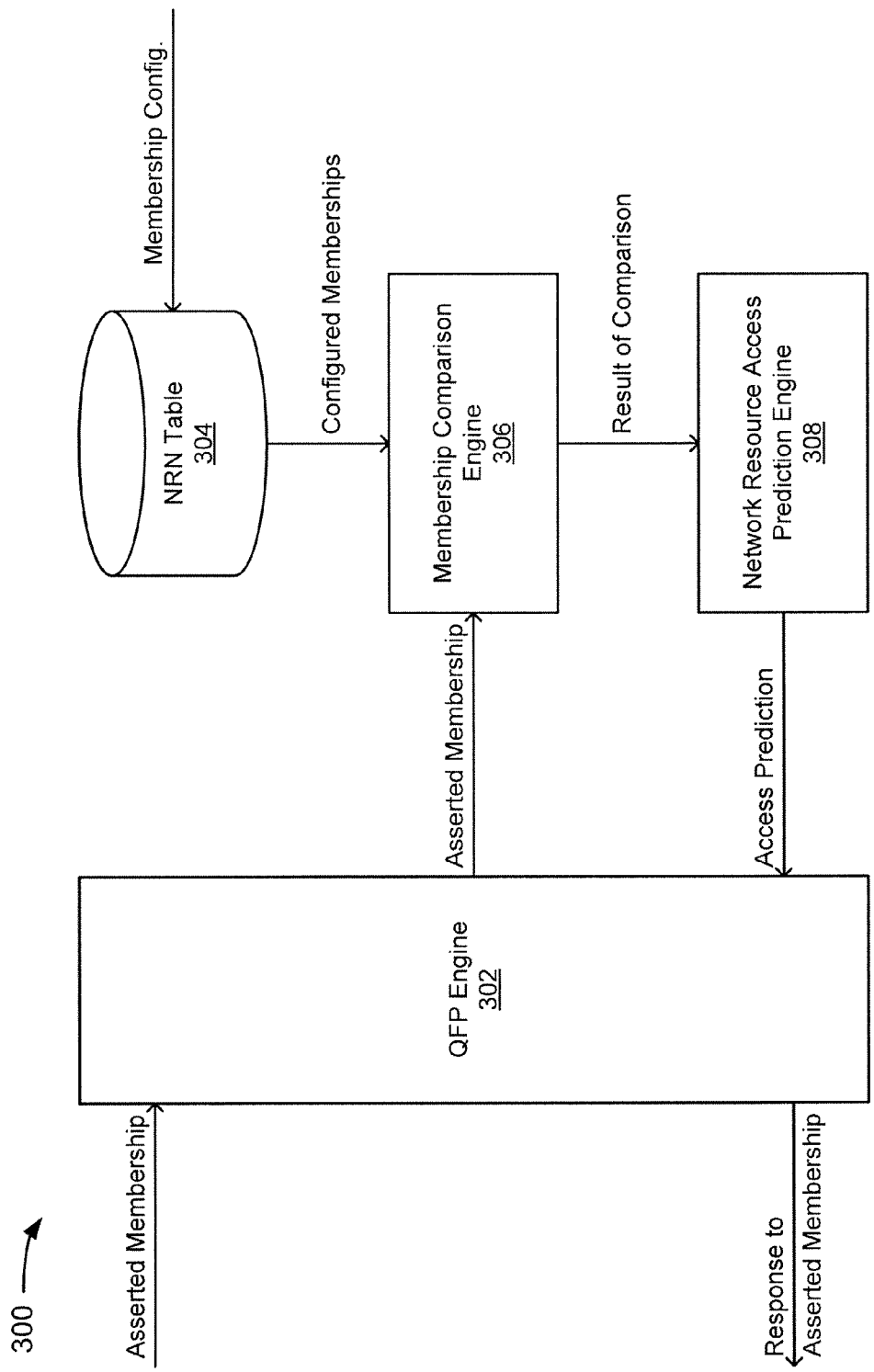
FIG. 3 depicts an example of a potential authentication indication (PAI) engine.

FIG. 3 depicts an example of a PAI engine 300, such as the PAI engine described with reference to FIG. 1. The PAI engine 300 includes a query front-end processing (QFP) engine 302, a network resource name (NRN) table 304, a membership comparison engine 306, and a network resource access prediction engine 308.

In the example of FIG. 3, the QFP engine 302, can include hardware, firmware, or software implemented in hardware or firmware and executed by a processor, such as a microprocessor. The QFP engine 302 can include routines, circuitry, procedures or other sub modules for receiving requests and transmitting responses, such as by inter-process communications with systems operating on an AP.

In the example of FIG. 3, the NRN table 304 can include a database, file, data store, list of records, table, or other data management device for storing information describing membership of users and/or groups in wireless realms. The NRN table 304 can include a cache of such information compiled by an entity managing a wireless realm. The location of or distributed nature of the NRN table 304 is not critical so long as an NRN table interface is available to access the data.

In the example of FIG. 3, the membership comparison engine 306 can include hardware, firmware, or software implemented in hardware or firmware for execution by a processor. The membership comparison engine 306 can compare an asserted membership received in, for example, a QTP query, with a configured membership stored in the NRN table 304.

In the example of FIG. 3, the network resource access prediction engine 308 can include hardware, firmware, or software implemented in hardware or firmware for execution by a processor. The network resource access prediction engine 308 can provide an access prediction based on the result of a comparison from the membership comparison engine 306. The QFP engine 302 can provide the access prediction as a response to an asserted membership, if applicable.

In the example of FIG. 3, in operation, the NRN table typically receives membership configurations for users and/or groups, as is depicted by the Membership Configurations arrow pointing toward the NRN table 304 in the example of FIG. 3. The membership configurations can be provided to the NRN table in an automated or manual fashion.

In the example of FIG. 3, in operation, the QFP engine 302 receives an asserted membership. The asserted membership can be received in, for example, a QTP query. The asserted membership can be received or otherwise originate at a station.

In the example of FIG. 3, in operation, the QFP engine 302 provides the asserted membership to the membership comparison engine 306. The membership comparison engine 306 compares the asserted membership with configured memberships from the NRN table 304. If there is a match, then the user associated with the asserted membership appears to have access to the network resource in question, assuming the asserted membership is true.

In the example of FIG. 3, in operation, the membership comparison engine 306 provides the result of the comparison to the network resource access prediction engine 308, which, in turn, provides an access prediction to the QFP engine 302 in accordance with the result of the comparison. In a specific implementation, the QFP engine 302 provides a response to the asserted membership if the access prediction is favorable, and does not respond if the access prediction is not favorable.

Figure 4:
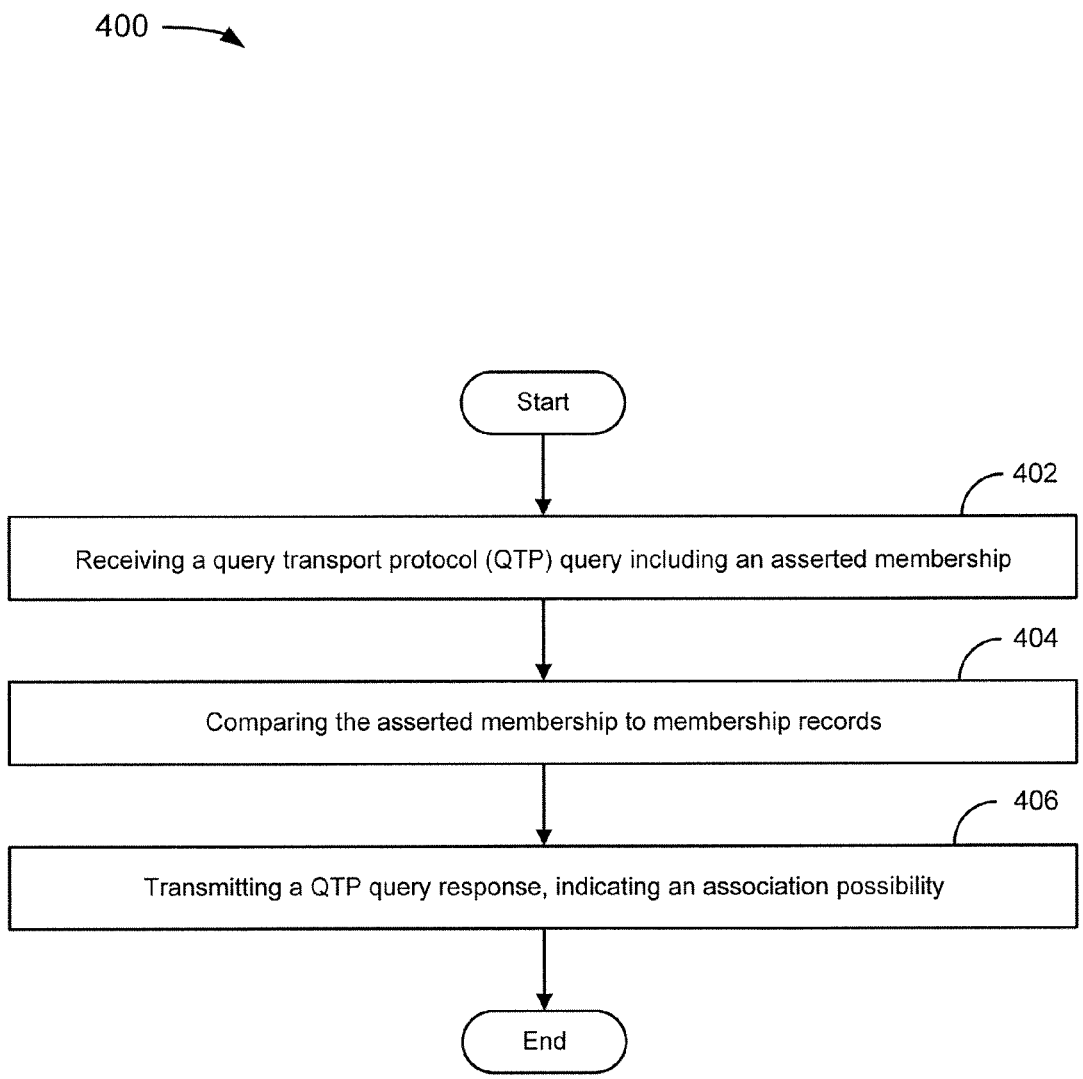
FIG. 4 depicts a flowchart of an example of a method for predicting access to a network resource.

FIG. 4 depicts a flowchart 400 of an example of a method for predicting access to a network resource. The method is organized as a sequence of modules in the flowchart 400. However, it should be understood that these and modules associated with other processes and methods described herein may be reordered for parallel execution or into different sequences of modules.

In the example of FIG. 4, the flowchart 400 starts at module with 402 with receiving a QTP query including an asserted membership. The asserted membership can be provided in a container that includes information sufficient to define a membership of a user (or group in which the user is a member) in a wireless realm. The QTP query can query whether a station associated with the user will be able to attach to an AP, and through the AP to a network resource in an as-of-yet un-attempted access request for the network resource.

In the example of FIG. 4, the flowchart 400 continues to module 404 with comparing the asserted membership to membership records. Wireless realms can allow access to stations because of membership in a wireless realm that a user of the station already has. Such membership can be based on a partnership agreement between operators of various wireless realms.

In the example of FIG. 4, the flowchart 400 continues to module 406 with transmitting a QTP query response, indicating an attachment possibility. The response itself can be indicative of an attachment possibility, or the response can include a prediction regarding whether access to the network resource for the as-of-yet un-attempted request will be allowed. Having indicated an attachment possibility, the flowchart 400 ends. A station, having received an indication of an attachment possibility, may attempt to attach (not shown), and the success of the attempt will depend upon whether the asserted membership can be shown by the station to be true.

Figure 5:
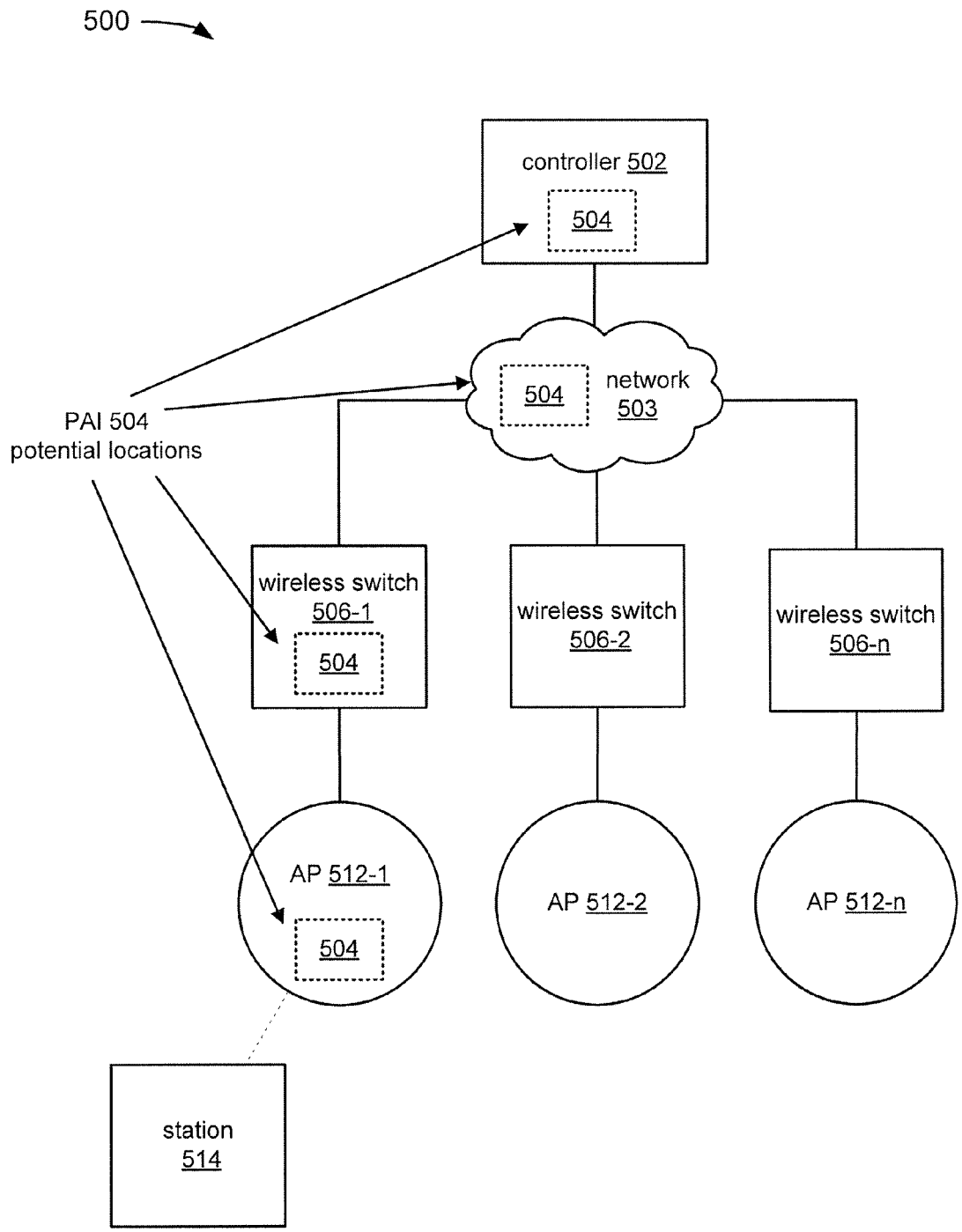
FIG. 5 depicts an example of an infrastructure network including potential locations for a PAI engine.

FIG. 5 depicts an example of an infrastructure network including potential locations for a PAI engine. FIG. 5 includes controller 502, network 503, PAI engine 504, wireless switch 506-1 through wireless switch 506-n (collectively wireless switches 506), AP 512-1 through AP 512-n (collectively APs 512).

In the example of FIG. 5, the controller 502 can be practically any type of device that is capable of communicating with a communications network, for example, a mainframe or a workstation, server class computing device, or other computing device. The controller 502 can be connected to a wired backbone network (not shown), either directly or indirectly through a wireless network. The controller 502 can include, by way of example but not limitation, a Lightweight Directory Access Protocol (LDAP) server, a policy server, a combination of these servers, or another known or convenient server.

In the example of FIG. 5, the network 503 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 5, the PAI engine 504 can be located in a variety of locations as depicted, for example, as a module or component of the controller 502, as a module or component of the wireless switches 506, or as a module or component of the APs 512. The PAI engine 504 could be located in or as an intermediate entity within or coupled to the APs 512, the controller 502, the wireless switches 506, or the network 503.

In the example of FIG. 5, the wireless switches 506 are devices, such as specific purpose computing devices coupled together by a wired backbone. The wireless switches 506 can swap data and client information including authentication and authorization attributes and information. The wireless switches 506 can provide forwarding, queuing, tunneling, and/or some security services for the information the wireless switches 506 receive from APs 512. The wireless switches 506 can coordinate, provide power to, and/or manage the configuration of the APs 512. In a non-limiting example, the wireless switches are Trapeze Networks Mobility Exchange® Switches, available from Trapeze Networks, Inc., of Pleasanton, Calif.

In the example of FIG. 5, the APs 512 are stations that transmit and receive data (and may therefore be referred to as transceivers) using one or more radios. For example, an AP may have a radio that is configured for any band in which, for example, 802.11 is standardized. As another example, an AP may have multiple radios, such as a 2.4 GHz and a 5 GHz radio. In a non-limiting example, an access point transmits and receives information as radio frequency (RF) signals to and from a wireless client over an Ethernet connection. The access points 512 transmit and receive information to and from their associated wireless exchange switches 506. Connection to a second wireless exchange switch can provide redundancy.

In the example of FIG. 5, in operation, supposing the PAI engine 504 is located within the AP 512-1, the station 514 transmits a request for a prediction of the ability of the station 514 to attach to one of the APs 512, and through the AP to a network resource. The request is processed within the PAI engine 504 and a response, if appropriate, can be transmitted by the AP 512-1.

Alternatively, in the example of FIG. 5, supposing the PAI engine 504 is located within the wireless switch 506-1, the station 514 transmits a request for a prediction of the ability of the station 514 to attach to one of the APs 512, and through the AP to a network resource. The request is retransmitted to the wireless switch 506-1 where the PAI engine 504 is located. The PAI engine 504 processes the request and provides a response to the wireless switch 506-1 which transmits the response back to AP 512-1 which in turn transmits the response to the station 514, if appropriate.

Alternatively, in the example of FIG. 5, supposing the PAI engine 504 is located within the controller 502, the station 514 transmits a request for a prediction of the ability of the station 514 to attach to one of the APs 512, and through the AP to a network resource. The request is transmitted to the wireless switch 506-1 which sends the request to the controller 502 via the network 503. The controller 502 provides the request to the PAI engine 504 which processes the request and provides a response. The controller 502 sends a response to wireless switch 506-1 via the network 503, and the wireless switch 506-1 provides the response to the AP 512-1. The AP 512-1 then transmits the response to the station 514, if appropriate.

Figure 6:
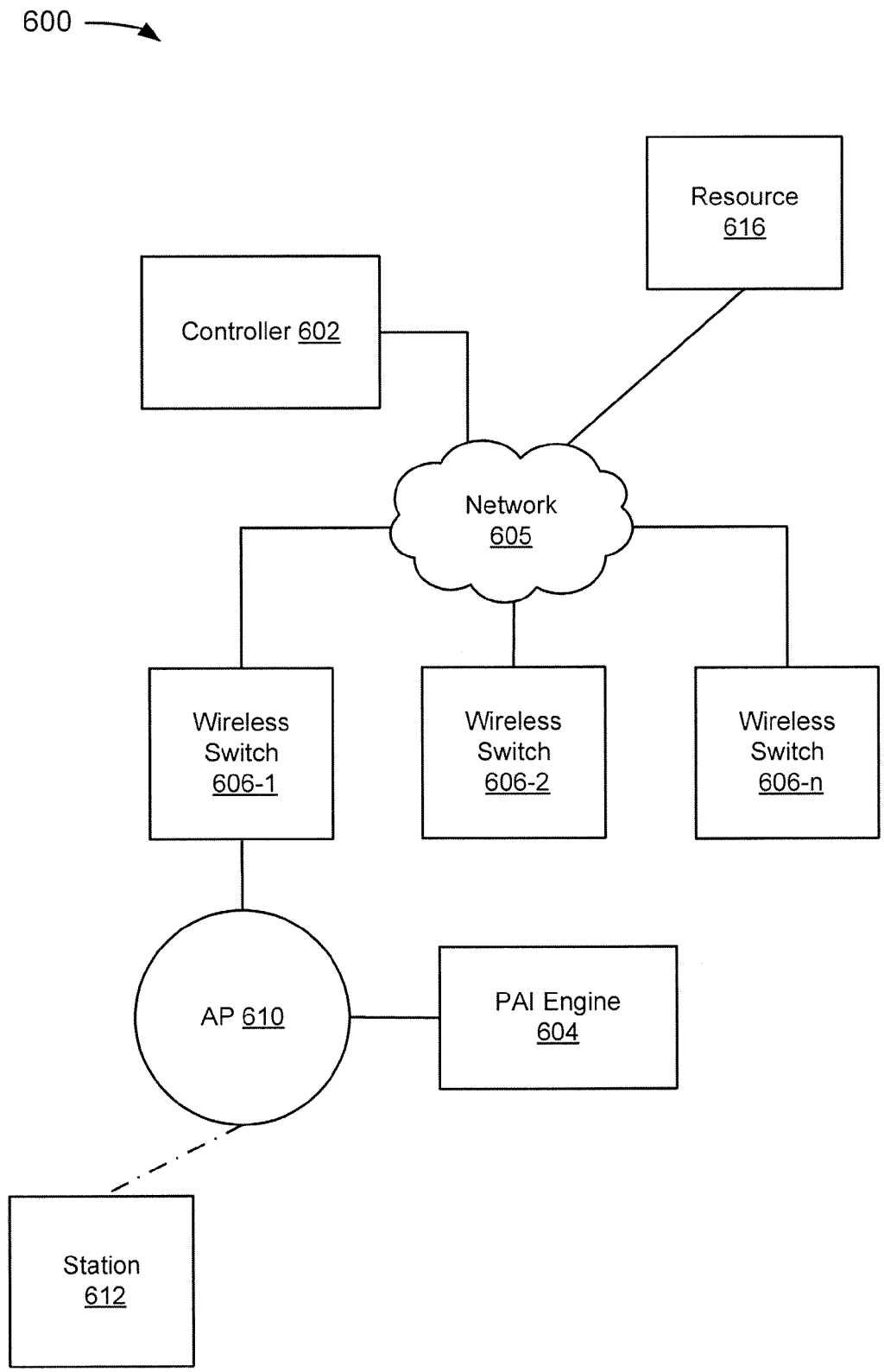
FIG. 6 depicts an example of a system in which a station in the context of an infrastructure network queries for a prediction as to whether it is possible to access a resource.

FIG. 6 depicts an example of a system 600 in which a station in the context of an infrastructure network queries for a prediction as to whether it is possible to access a resource. In the example of FIG. 6, the infrastructure network is an infrastructure network as discussed in reference to FIG. 5. In the example of FIG. 6, a resource 616 can be a network, part of a network, computing system, cluster, website, or other desirable system or unit of information.

In a non-limiting example, a user of the station 612 can attempt to access an airlines reservation website from within an airport. Assume the providers of wireless access have a partnership with the airport allowing access to the reservation site. The user can communicate a request to the AP 610 which can provide the request to the PAI engine 604, and the PAI engine 604 can consider membership required to access the resource 616 to determine whether the user might potentially have appropriate membership rights. A prediction can be provided to the AP 610. As can be noted, the closer the PAI engine 604 is to the AP 610, the shorter the distance (and, presumably, the fewer network resources consumed).

Depending upon the implementation, embodiment, and/or user preferences, a user of the station 612 may decide to attach to the AP 610 only after receiving a favorable prediction.

Figure 7:
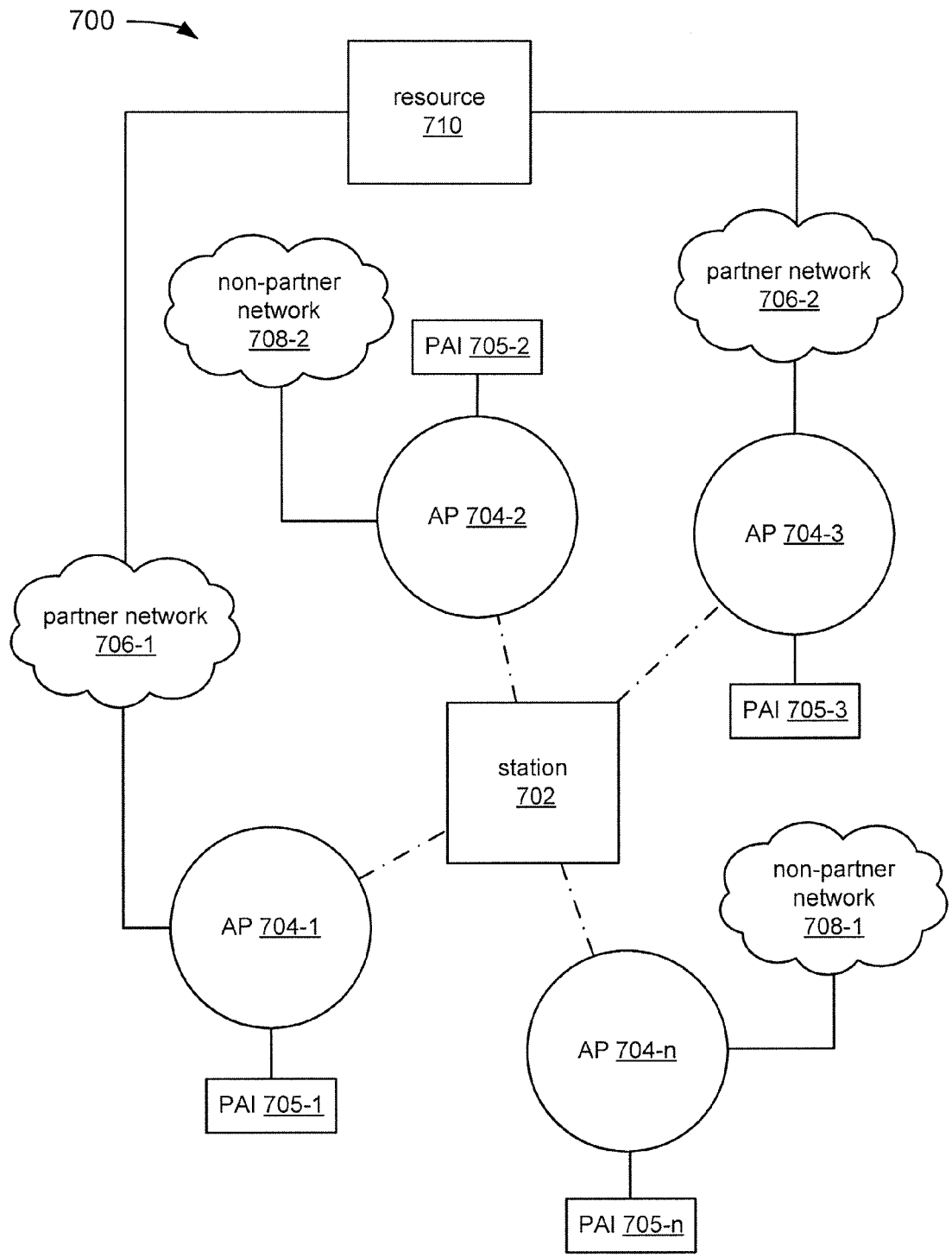
FIG. 7 depicts an example of a system in which a station, in the context of multiple networks, queries whether a network resource is predicted to be accessible to a user of the station.

FIG. 7 depicts an example of a system 700 in which a station, in the context of multiple networks, queries whether a network resource is predicted to be accessible to a user of the station. FIG. 7 includes station 702, AP 704-1 through AP 704-n (collectively APs 704), PAI engine 705-1 through PAI engine 705-n (collectively PAI engines 705), partner network 706-1 through 706-2 (collectively partner networks 706), non-partner networks 708-1 through 708-2, resource 710.

In the example of FIG. 7, the station 702 can be a station as defined in reference to, for example, FIG. 1. The APs 704 can be APs as defined in reference to, for example, FIG. 1 or FIG. 5. The PAI engines 705 can be as defined in the figures described above, and the resource 710 can be as defined in reference to, for example, FIG. 6.

In the example of FIG. 7, the partner networks 706 can be networks having agreements to allow access to the resource 710 for members of another network, in which the user associated with the station 702 is a member. Contrarily, the non-partner networks 706 can be networks lacking agreements to allow access to the resource 710.

In the example of FIG. 7, in operation, the station 702 can transmit a query to all APs in range of the station 702 to gather predictions from the APs 704 indicating whether any of the APs 704 will allow access to the resource 710. The APs 704-1 and 704-3, which are connected to partner networks 706 can determine that access to the resource 710 is predicted to be allowed. However, the APs 704-1 and 704-n are connected to non-partner networks 708. As such, for illustrative purposes, no access is predicted to be allowed. The APs 704 transmit responses to the station 702 indicating that access is predicted to be allowed, or the APs 704 either do not transmit responses or transmit negative responses if access is not predicted to be allowed. The station 702 can then display a list of the APs, or data associated with the APs, predicted to allow access. Also the station 102 could take action to automatically access the resource 710.

Figure 8:
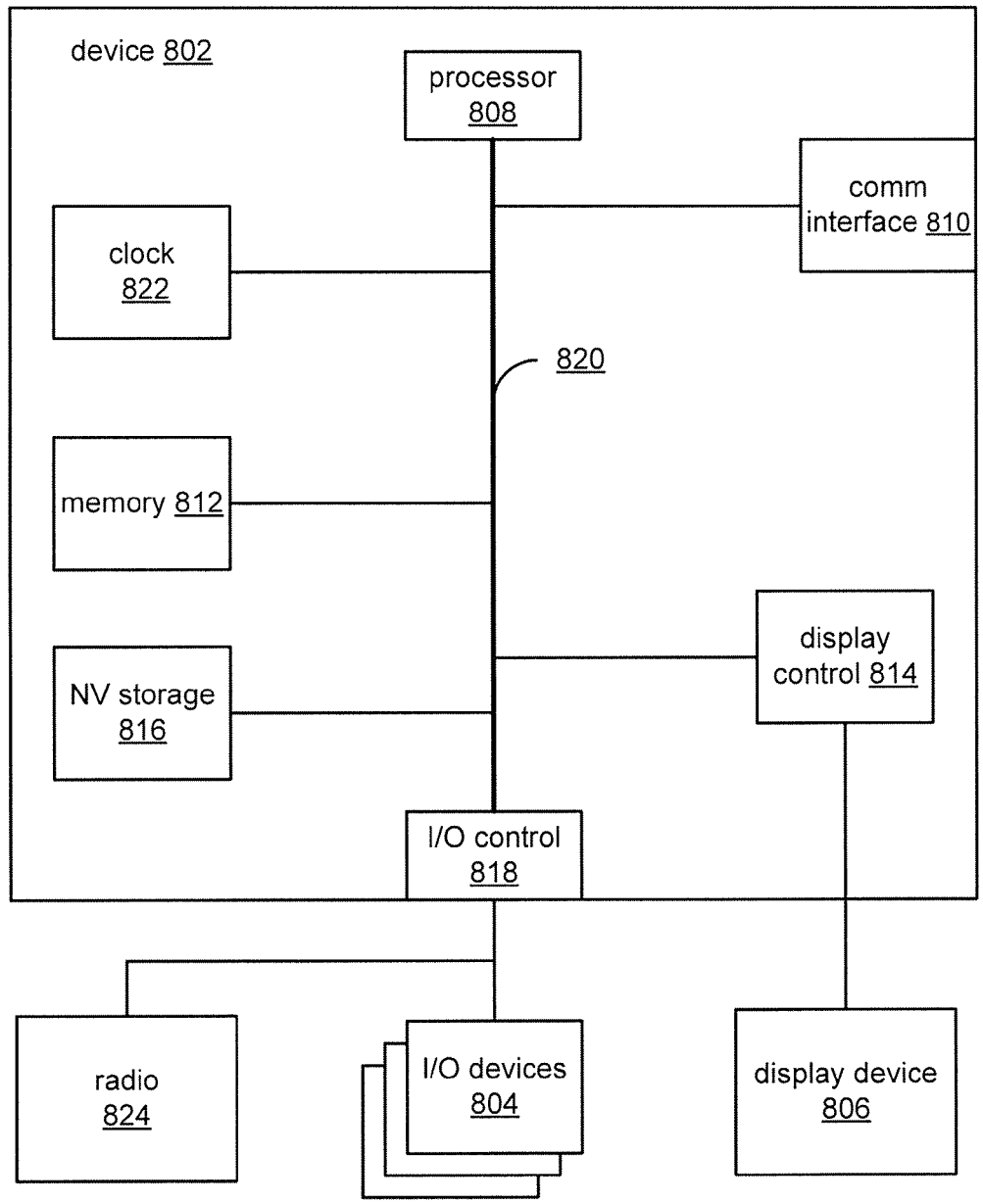
FIG. 8 depicts an example of a computing system that is representative of the computing systems discussed herein.

FIG. 8 depicts an example of a computing system that is representative of the computing systems discussed herein. The system 800 may be a conventional computer system that can be used as a client computer system, such as a wireless client or a workstation, or a server computer system. The system 800 includes a device 802, I/O devices 804, and a display device 806. The device 802 includes a processor 808, a communications interface 810, memory 812, display controller 814, non-volatile storage 816, I/O controller 818, clock 822, and radio 824. The device 802 may be coupled to or include the I/O devices 804 and the display device 806.

The device 802 interfaces to external systems through the communications interface 810, which may include a modem or network interface. It will be appreciated that the communications interface 810 can be considered to be part of the system 800 or a part of the device 802. The communications interface 810 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 808 may be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, to the display controller 814, and to the I/O controller 818.

The I/O devices 804 can include a keyboard, disk drives, printers, a scanner, and other input and output devices, including a mouse or other pointing device. The display controller 814 may control in the conventional manner a display on the display device 806, which can be, for example, a cathode ray tube (CRT) or liquid crystal display (LCD). The display controller 814 and the I/O controller 818 can be implemented with conventional well known technology.

The non-volatile storage 816 is often a magnetic hard disk, flash memory, an optical disk, or another form of storage for large amounts of data. Some of this data is often written, by a direct memory access process, into memory 812 during execution of software in the device 802. One of skill in the art will immediately recognize that the terms "machine-readable medium" or "computer-readable medium" includes any type of storage device that is accessible by the processor 808.

Clock 822 can be any kind of oscillating circuit creating an electrical signal with a precise frequency. In a non-limiting example, clock 822 could be a crystal oscillator using the mechanical resonance of vibrating crystal to generate the electrical signal.

The radio 824 can include any combination of electronic components, for example, transistors, resistors and capacitors. The radio is operable to transmit and/or receive signals.

The system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

In addition, the system 800 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 816 and causes the processor 808 to execute the various acts required by the operating system to input and output data and to store data in memory, including storing files on the non-volatile storage 816.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A method, comprising:
   receiving, from a station, a query transport protocol (QTP) query, the QTP query including an asserted membership to a target network from a plurality of networks, the QTP query requesting an indication of an attachment possibility with the station to the target network;
   comparing the asserted membership to the target network to membership records;
   transmitting, to the station, before a request is sent from the station to attach to the target network, a QTP query response when the asserted membership matches the membership records, the QTP query response indicating an association possibility; and
   transmitting, to the station, a representation of a list including the target network and a subset of the plurality of networks, each network from the subset of the plurality of networks having an association possibility, the subset of the plurality of networks excluding the target network.

2. The method of claim 1, wherein access to a network resource is allowed as a benefit of membership in the target network, the method further comprising identifying a relationship between the asserted membership in the target network and the network resource.

3. The method of claim 1, wherein membership in the target network does not include access to a network resource, the method further comprising predicting a prospective denial of access to the network resource to define a denial possibility, the QTP query response indicating the denial possibility.

4. The method of claim 1, wherein access to a network resource is allowed, but access to at least one other resource on a network is not allowed, the method further comprising predicting an allowance of access to the network resource as a benefit of membership in the target network to define an allowance possibility, the QTP query response indicating the allowance possibility.

5. The method of claim 1, wherein access to a network resource via a network is allowed and access to all other network resources via the network is disallowed, the method further comprising predicting an allowance of access to the network resource independent of membership in the target network to define an allowance possibility, the QTP query response indicating the allowance possibility.

6. The method of claim 1, wherein absence of membership in the target network is indicative of access to a network, the method further comprising predicting a denial of access to a network resource based on the asserted membership in the target network to define a denial possibility, the QTP query response indicating the denial possibility.

7. The method of claim 1, further comprising, predicting an allowance of access to a network resource based on a relationship between the asserted membership in the target network and third party indicating access to network resource to define an allowance possibility, the QTP query response indicating the allowance possibility.

8. A method, comprising:
   transmitting, from a wireless station before a request to attach to a first access point (AP), to the first AP, a query transport protocol (QTP) query including an asserted membership in a wireless realm, the QTP query requesting an indication of an attachment possibility;
   receiving at the wireless station, from the first AP, a QTP query response including a prediction that the asserted membership is associated with permission to access a network resource;
   receiving at the wireless station a representation of a list of APs including the first AP and at least a second AP from a plurality of APs, each AP from the plurality of APs having an association possibility;
   sending from the wireless station, to the first AP and after the receiving, the request to attach to the first AP from the representation of the list of APs; and
   sending from the wireless station, to the first AP an attach signal such that the first AP couples the wireless station to the network resource.

9. The method of claim 8, further comprising receiving at the wireless station a plurality of subsequent indications of relationships between a plurality of networks and the asserted membership in the wireless realm, the plurality of subsequent relationships including at least one prediction of allowance to the network resource.

10. The method of claim 9, further comprising displaying one or more indicators associated with one or more available networks, each of the one or more networks predicting that access to the network resource will be allowed for the asserted membership.

11. The method of claim 8, further comprising selecting one or more criteria indicative of membership in the wireless realm and including the one or more criteria in the QTP query.

12. The method of claim 8, further comprising accessing the network resource based on the prediction that the asserted membership is associated with permission to access the network resource.

13. The method of claim 8, further comprising refraining from attempting to access the network resource based on an indication that the wireless station will be denied access to the network resource.

14. The method of claim 8, further comprising automatically accessing the network resource upon indication from the second access point that the first AP will allow the wireless station to access the network resource via the first AP.

15. The method of claim 8, wherein the request to attach to the first AP is sent in response to receiving, at the workstation, an indication of a user selection of the first AP from the representation of the list of APs.

16. An apparatus, comprising:

a query front-end processor (QFP) engine configured to be coupled to (1) a membership comparison engine, (2) a network resource name (NRN) table and (3) a network resource access prediction engine, the QFP engine configured to receive a query transport protocol (QTP) query from a station, before the station sends a request to attach to a wireless realm, the QTP query including an asserted membership in the wireless realm, the QTP query requesting an access prediction;

the QFP engine configured to provide the asserted membership to the membership comparison engine to compare the asserted membership with configured memberships from the NRN table, the QFP engine configured to receive a plurality of access predictions from the network resource access prediction engine based on a result of the comparison, each access prediction from the plurality of access predictions uniquely associated with a network from a plurality of networks, the QFP engine configured to transmit to the station a QTP query response indicating the plurality of access predictions for the plurality of networks.

17. The apparatus of claim 16, wherein the QFP engine is configured to be coupled to the NRN table, the NRN table including multiple records of third parties allowed access to the wireless realm based on membership in other wireless realms.

18. The apparatus of claim 16, wherein the QFP engine is configured to be coupled to a network resource access prediction engine that is configured to predict access to a fringe of a mesh network will be allowed.

19. The apparatus of claim 16, wherein the QFP engine is configured to be included in a controller configured to define control of an enterprise network.

20. The apparatus of claim 16, wherein the QFP engine is configured to be included in an access point including the NRN table, the membership comparison engine, and the network resource access prediction engine.

\* \* \* \* \*